Dec. 18, 1951    S. C. STRIBLING, JR., ET AL    2,579,160
COMPLEX SIGNAL MEASURING
Filed Aug. 31, 1950
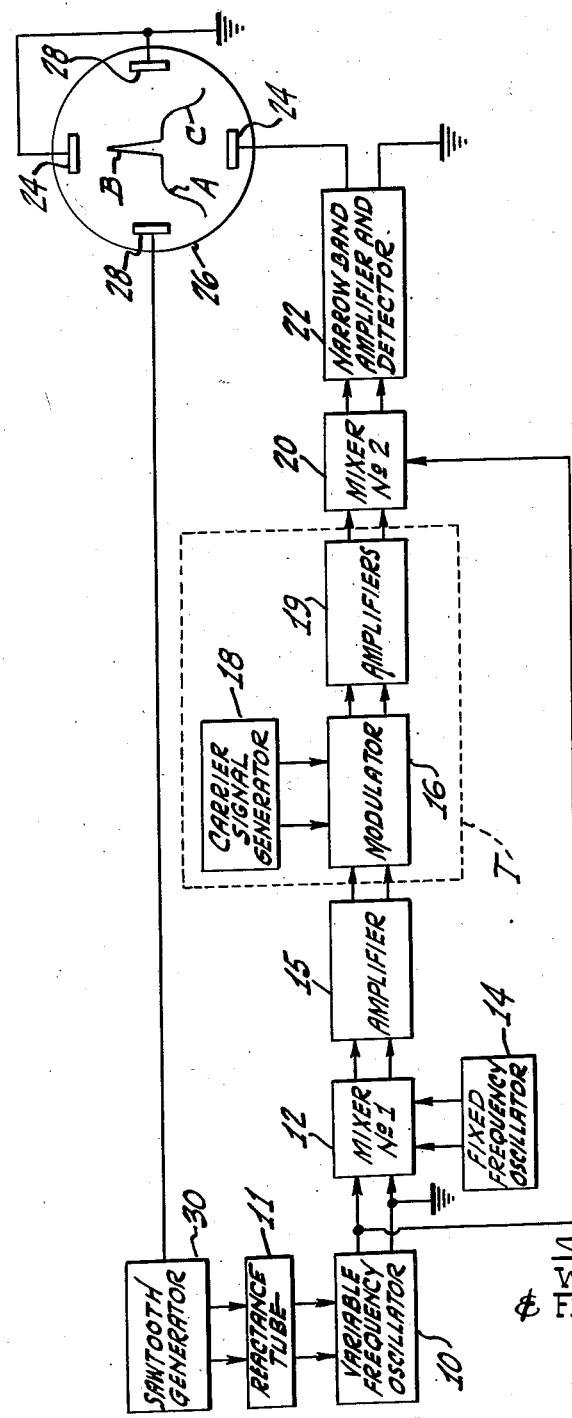
INVENTORS:
STILES C. STRIBLING, JR.
WILLIAM T. DOUGLAS, JR.
& FRANKLIN E. TALMAGE
BY
ATTORNEY Patented Dec. 18, 1951

2,579,160

UNITED STATES PATENT OFFICE 2,579,160

COMPLEX SIGNAL MEASURING

Stiles C. Stribling, Jr., Haddonfield, William T. Douglas, Jr., Oaklyn, and Franklin E. Talmage, Westmont, N. J., assignors to Radio Corporation of America, a corporation of Delaware Application August 31, 1950, Serial No. 182,464

7 Claims. (Cl. 332—39)

This invention relates to improvements in methods of and systems for measuring the components of a complex signal, and particuluarly to an improved method of and system for measuring the amplitudes of two mixed signal components of varying freqnency. While not limited thereto, the invention is particularly applicable to the measurement of varying frequency sideband components of a modulated signal, and provides an improved method and system for obtaining an instantaneous visual display of the overall response of an amplitude modulated transmitter or transmission system, the response being determined from observation of the relative amplitudes of the sidebands produced by a suitable rapidly varying input signal applied to the transmitter or transmission system.

In conventional modulation systems, such as those found in radio and television transmitters, for example, the intelligence to be transmitted is mixed with a relatively high frequency carrier signal. As is well known, this modulation of the fixed frequency carrier results in the generation of so-called upper and lower sidebands, having frequencies equal to the sum and difference, respectively, of the carrier and the modulating signals. In some cases, the transmitter circuits are designed and adjusted to amplify the carrier and both sidebands without appreciable distortion. In so-called vestigial sideband systems, one of the sidebands is partially suppressed, while the remaining sideband is kept intact. In either case, it is important that the transmitter circuits be accurately aligned and adjusted to function in the intended manner.

Heretofore, there has been no completely satisfactory solution to the problem of aligning such circuits. Unless a modulated signal similar to the normal modulated carrier is used for testing purposes, one cannot be sure that the circuits are responding in precisely the same manner that they would to a modulated signal. Therefore, a single frequency signal, while relatively simple to measure, may not provide accurate results. On the other hand, if a modulated signal is used, there is difficulty in separating and measuring the upper and lower sidebands as is necessary for accurate results. For example, in testing a transmitter, one can make the desired measurements by modulating the transmitter with signals of different frequencies, one after another, and using filters to measure the upper and lower sidebands separately at each frequency. However, this procedure is very tedious since the effect of a given adjustment may show up at several different frequencies. A far more satisfactory procedure would be to use a varying or sweep frequency signal, and to observe the circuit output as vertical deflection of a cathode ray beam which is horizontally deflected in synchronism with the signal frequency variation. Where this sweep frequency system is used, however, the problem of separating the upper and lower sidebands is particularly troublesome, since a detector circuit which has sufficient bandwidth to reproduce all of the frequencies involved will reproduce both the upper and lower sidebands simultaneously. Therefore, when one attempts to make adjustments on the system, one cannot be sure whether the change caused by a particular adjustment represents an increase in one sideband or a decrease in the other sideband. In many cases, especially in vestigial sideband transmission systems, it is very important to know which of the sidebands is being modified by a circuit adjustment.

It is, therefore, a general object of the present invention to provide an improved method of and apparatus for producing, separating and measuring mixed varying frequency signals.

Another object of the invention is the provision of an improved method of and apparatus for generating and separating two mixed varying frequency signal components to facilitate amplitude measurements thereof in testing circuit response.

A further object of the invention is the provision of an improved method of and apparatus for observing the effect of circuit adjustments on the sidebands of a modulated signal while such signal is passing through a circuit being adjusted.

In accordance with the invention, the foregoing and other related objects and advantages are obtained by mixing with a signal containing two varying frequency components a third signal which is varying in such a way as to first maintain a fixed difference between the third signal and one of the components to be measured and then to maintain the same fixed difference between the third signal and the other component to be measured. With this arrangement, it is possible to utilize a narrow bandwidth measuring circuit, tuned to the fixed difference frequency, to select first the one and then the other varying component for measurement purposes.

A more complete understanding of the invention can be had by reference to the following description of an illustrative embodiment thereof, when considered in connection with the accompanying drawing, the single figure of which is a block diagram of a transmitter testing system arranged in accordance with the invention.

Referring to the drawing, the apparatus shown comprises a variable frequency oscillator 10 adapted to generate a signal of frequency $f_1$ which is variable through a range $F_1-Z$ to $F_1+Z$. Here the symbol $F_1$ respresents the center frequency of the oscillator 10, $f_1$ is the instantaneous output frequency of the oscillator, and Z is the maximum deviation from $F_1$. For example, the oscillator 10 may be adapted to be controlled by a so-called reactance tube 11, as in the manner shown at page 655 in Terman's Radio Engineers' Handbook (McGraw-Hill Book Company, Inc., 1943). The frequency $f_1$ of the oscillator 10 is established in a manner described hereinafter.

The oscillator 10 is connected to supply the signal $f_1$ to a mixing circuit 12, which also receives a fixed frequency signal $F_1$ from a second oscillator 14. The output of the mixer 12, therefore, will comprise principally the components $F_1, f_1$, $F_1+f_1$, and $F_1-f_1$. The mixer output preferably is passed through an amplifier 15 where all components of the mixer output are eliminated except the varying component $(F_1-f_1)$, hereinafter called $z$. Therefore, the amplifier output signal will vary in frequency from Z to zero to Z. The mixer 12 and oscillator 14 may comprise any of a number of well known circuits of this type, such, for example, as are shown at pp. 569 and 570 of the above mentioned handbook, while the amplifier 15 may be a so-called video amplifier of the type shown, for example, at pp. 413–434 of the same handbook.

The amplifier 15 is connected to the modulator circuit 16 in a radio transmitter T being tested. In the modulator 16, the signal from the amplifier 15 is utilized to modulate a fixed frequency carrier signal $F_2$, generated by an oscillator 18 in the transmitter T. Since the signal supplied by the mixer 12 is varying in frequency from Z to zero to Z, the output of the modulator 16 will contain the carrier component $F_2$, and components $F_2+z$ and $F_2-z$, comprising the upper and lower sidebands of the modulated carrier signal. This, of course, corresponds generally to a signal such as normally would be transmitted from the transmitter T.

The output signal from the modulator 16 may pass through amplifiers 19 in the transmitter T to the antenna circuit (not shown). A "sample" of this output signal is applied to a second mixer circuit 20. The second mixer 20 also is connected to receive the signal $f_1$ from the variable oscillator 10. The output of the second mixer 20 will contain, among others, the components $F_2+z \pm f_1$, which is representative of the upper sideband of the transmitter output, and $F_2-z \pm f_1$, representative of the lower sideband.

Since the signal $f_1$ from the oscillator 10 varies from $F_1-Z$ to $F_1+Z$, it can be seen that during the time $f_1$ is varying from $F_1-Z$ to $F_1$, the lower sideband second mixer output component $F_2-z \pm f_1$ can be expressed as $F_2-z \pm (F_1-z)$. This can be further broken down into two components, both representative of the lower sideband $(F_2-z)$ of the transmitter output:

$(a) = F_2-z+(F_1-z) = F_2+F_1-2z$
$(b) = F_2-z-(F_1-z) = F_2-F_1$

At the same time, the upper sideband second mixer output component $F_2+z \pm f_1$ can be explained as $F_2+z \pm (F_1-z)$. This can be further broken down into two components, both representative of the upper sideband $(F_2+z)$ of the transmitter output.

$(a') = F_2+z+(F_1-z) = F_2+F_1$
$(b') = F_2+z-(F_1-z) = F_2-F_1+2z$

During the time $f_1$ is varying from $F_1$ to $F_1+Z$, the upper sideband second mixer output component $F_2+z \pm f_1$ can be expressed as $F_2+z \pm (F_1+z)$. This can be further broken down into two components, both representative of the upper sideband of the transmitter output $(F_2+z)$:

$(c) = F_2+z+(F_1+z) = F_2+F_1+2z$
$(d) = F_2+z-(F_1+z) = F_2-F_1$

At the same time the lower sideband second mixer output component $F_2-z \pm f_1$ can be expressed as $F_2-z \pm (F_1+z)$. This can be further broken down into two components, both representative of the lower sideband of the transmitter output $(F_2-z)$:

$(c') = F_2-z+(F_1+z) = F_2+F_1$
$(d') = F_2-z-(F_1+z) = F_2-F_1-2z$

Of the eight components $(a) \ldots (d)$ and $(a') \ldots (d')$, it can be seen that two, $(b)$ and $(d)$, are the same fixed frequency; $(F_2-F_1)$. Therefore, by passing the output signal of the second mixer 20 through a tuned amplifier and detector circuit 22, which is tuned to the frequency $F_2-F_1$, one can obtain a signal which will represent first the lower sideband and then the upper sideband of the transmitter output. Similarly, it can be seen that $(a')$ and $(c')$ are the same fixed frequency $(F_2+F_1)$, and these components $(a')$, $(c')$ will represent first the upper sideband and then the lower sideband of the transmitter output. Therefore, the tuned circuit 22 can be adjusted to the sum of the frequencies $F_1$, $F_2$ if desired. Either arithmetical combination can be used, depending on design considerations in the particular equipment involved. Typical examples of suitable narrow band or tuned amplifiers are given at p. 435 of the above-mentioned handbook. The detector may comprise a conventional diode detector or the equivalent.

The amplifier 22 is connected to the vertical deflection plates 24 of a cathode ray oscilloscope 26. The horizontal deflection plates 28 of the oscilloscope are connected to receive a sawtooth "sweep" voltage from a sawtooth voltage generator 30. For simplicity, other details of the oscilloscope 26 have been omitted.

In order that the horizontal sweep of the cathode ray beam in the oscilloscope 26 will be in synchronism with the frequency variations of the oscillator 10, the oscillator 10 can be connected to be controlled by the sawtooth generator 30. For example, if the control for the oscillator 10 comprises a reactance tube, then the sawtooth voltage from the generator 30 can be applied to the reactance tube control grid to control the oscillator frequency. Examples of suitable sawtooth voltage generators are given at pp. 512–515 of the above-mentioned handbook. Alternatively, the oscillator 10 can be mechanically controlled by a rotating capacitor driven by a synchronous motor, with the sine wave voltage supplied to the motor also being used as horizontal sweep voltage.

For the sake of concreteness, an example will be given of typical frequencies utilized in a system of the type shown in the drawing, although it will be understood that the values assigned are illustrative only. In a system for aligning and testing a transmitter adapted to operate at a frequency of 193.25 megacycles, (hereinafter "mc."), the center frequency $F_1$ of the oscillator 10 (and the frequency $F_1$ of the oscillator 14) was chosen to be 130 mc. The maximum deviation Z of the oscillator 10 from center frequency $F_1$ was 5 mc. Therefore, the output signal of the first mixer varied from 5 to zero to 5 mc. The output of the transmitter T included an upper sideband varying from 198.25 to 193.25 mc., and a lower sideband varying from 188.25 to 193.25 mc. The amplifier and detector 22 was tuned to a frequency of 63.25 mc. As the frequency of the oscillator 10 varied from 125 to 130 mc., the lower sideband (188.25 to 193.25) combined therewith to provide a constant frequency signal of 63.25 mc. Simultaneously, the cathode ray beam in the oscilloscope 26 moved from the left hand side to the center of the oscilloscope screen to provide the portion A of the curve shown in the drawing. When the frequency of the oscillator 10 reached 130 mc., the 193.25 mc. carrier combined therewith to produce the curve peak B. Thereafter, as the oscillator output continued to vary from 130 to 135 mc., the transmitter upper sideband (193.25 to 198.25) combined therewith, and was presented as the curve portion C as the cathode ray beam moved from the center to the right hand edge of the oscilloscope screen. Thus, the effect on both sidebands of adjustments made in the circuits of the transmitter T could be observed simultaneously, greatly facilitating accurate adjustment.

It will be understood that the invention is not limited to the use of a circuit arranged precisely in the manner shown. For example, the band pass amplifier 15 is not essential, since unwanted frequencies will be eliminated either in the narrow band amplifier 22 or in the video or audio circuits of the transmitter. Also, buffer amplifiers may be added, as between the mixer 12 and the oscillator 14 for example, to prevent interaction between the various circuits. Again, the frequency of the oscillator 10 might be made to vary from $F_1+Z$ to $F_1-Z$ without changing the general mode of operation. Furthermore, the signal $z$ derived from the mixer 12 in the drawing could be obtained from a separate variable frequency osscillator arranged to vary in frequency in synchronism with the oscillator 10 although the system shown is deemed preferable. Also, the invention is applicable to sideband alignment of receiving as well as transmitting circuits. In this case, the modulator 16 and carrier signal generator 18 would comprise part of the apparatus for generating the desired test signal to be applied to the circuit under test.

Since these and other similar changes could be made in the specific apparatus shown and described, all within the scope and spirit of the invention, the foregoing is to be construed as illustrative, and not in a limiting sense.

What is claimed is:

1. In apparatus for determining the response of an electrical system to separate parts of a mixed varying frequency signal passed through said system, in combination, first circuit means to generate a first signal repeatedly varying in frequency between predetermined upper and lower limits about a selected center frequency, second circuit means coupled to said first circuit means to generate a second signal varying in frequency in synchronism with said first signal between zero and a value equal to half the difference between said upper and lower limits, an oscillator adapted to generate a fixed frequency third signal, third circuit means connecting said oscillator and said second circuit means for combining said second and third signals to pass through the circuit being tested, a fourth signal having two components of frequency equal, respectively, to the sum of and the difference between said second and third signals, fourth circuit means connected to said first circuit means and adapted to be connected to the output of said circuit being tested to combine said first signal with said fourth signal after said fourth signal has passed through said circuit being tested, and frequency sensitive measuring means connected to said fourth circuit means, said frequency sensitive measuring means being adjusted to measure only signals of a frequency equal to an arithmetical combination of the center frequency of said first signal and the frequency of said third signal.

2. Apparatus as defined in claim 1 wherein said first circuit means comprises a variable frequency oscillator, wherein said measuring means comprises a cathode ray oscilloscope including means to repeatedly deflect the cathode ray beam in said oscilloscope along the same path, and means coupling said deflecting means to said variable frequency oscillator to vary the frequency of said oscillator in synchronism with deflection of said cathode ray beam.

3. Apparatus as defined in claim 1 wherein said second circuit means comprises an oscillator adapted to operate at a frequency equal to said center frequency, and a mixing circuit connecting said first circuit means to said last named oscillator.

4. Apparatus for measuring the sideband response of a signal transmitter of the type including a carrier signal generator and a modulator for combining with the carrier signal from said generator a second signal to provide upper and lower sideband signals having frequencies equal respectively to the sum of and the difference between the frequencies of said carrier and second signals, said apparatus comprising an oscillator, means adapted to be coupled to said modulator for deriving from said oscillator and applying to said modulator a signal simulating said second signal and of frequency varying from a value Z to zero to Z whereby to generate in said modulator said upper and lower sideband signals, said value Z being a preselected constant, means to derive from said oscillator a third signal of frequency varying between the values F minus Z and F plus Z synchronism with the variations of said signal simulating said second signal, said value F being a second preselected constant, means to combine said third signal and said sideband signals, a narrow band amplifier and detector circuit connected to receive signals from said last named means and tuned to a fixed frequency equal to an arithmetic combination of the frequency of said carrier signal and said frequency F, a cathode ray oscilloscope having horizontal and vertical cathode ray beam deflecting means, connections from said detector to said vertical deflecting means, a sweep voltage generator connected to said horizontal deflecting means, and means to synchronize said frequency variations of said third signal and said simulating signal with the sawtooth output voltage of said sawtooth generator.

5. Apparatus for measuring the sideband response of a signal transmitter of the type including a carrier signal generator and a modulator for combining with the carrier signal from said generator, a second signal to provide upper and lower sideband signals having frequencies equal, respectively, to the sum of and the difference between the frequencies of said carrier and second signals, said apparatus comprising a variable frequency oscillator adapted to operate at a center frequency F and variable from a frequency F minus Z to a frequency F plus Z, Z being a constant, a second oscillator adapted to operate at a fixed frequency F, a signal mixing circuit connected to combine the signals from said oscillators to provide to said modulator a signal simulating said second signal and of frequency varying from Z to zero to Z whereby to generate in said modulator said upper and lower sideband signals, a second mixing circuit connected to said variable oscillator and adapted to be connected to said modulator to combine said sideband signals with the signal from said variable frequency oscillator, a narrow band amplifier and detector circuit connected to receive signals from said second mixing circuit and tuned to a frequency equal to the difference between the frequency of said carrier signal and said frequency F, a cathode ray oscilloscope having horizontal and vertical cathode ray beam deflecting means, a sawtooth voltage generator connected to said vertical deflecting means, and frequency control means coupled between said variable frequency oscillator and said sawtooth generator and responsive to sawtooth output voltage from said sawtooth generator to vary said variable oscillator frequency as a function of said sawtooth voltage.

6. Method of determining the sideband response of circuits in a transmitter system of the type wherein a carrier signal is modulated by a second signal to generate upper and lower sidebands having frequencies equal, respectively, to the sum of and the difference between the frequencies of said carrier and said second signal, said method comprising the steps of generating a first varying frequency signal of frequency varying repeatedly from a predetermined value to zero and back to said predetermined value, modulating the carrier signal in a transmitter to be tested with said varying frequency signal, passing said modulated carrier signal through the circuits to be tested, generating a second varying frequency signal of frequency varying repeatedly from below to above a selected center frequency in synchronism with said variations of said first varying frequency signal, the total frequency variation of said second varying frequency signal being twice the total frequency variation of said first varying frequency signal, mixing said second varying frequency signal with said modulated carrier signal after said modulated carrier has passed through the circuits being tested to produce a resultant fixed frequency signal representative first of one portion of said modulated carrier signal and then of another portion of said modulated carrier signal, and measuring the amplitude of said resultant signal as said varying frequencies vary.

7. Method of determining the sideband response of circuits in a transmitter system of the type wherein a carrier signal is modulated by a second signal to generate upper and lower sidebands having frequencies equal, respectively, to the sum of and the difference between the frequencies of said carrier and said second signal, said method comprising the steps of generating a first signal varying in frequency repeatedly about a selected center frequency between upper and lower limits equidistant from said center frequency, generating a fixed frequency signal of frequency equal to said center frequency, mixing said first signal and said fixed frequency signal to provide a third signal of frequency varying between zero and a value equal to half the total variation of said first signal, modulating said carrier with said third signal, passing the modulated carrier through the circuits to be tested, mixing the output signal from the circuits being tested with said first signal to provide a fourth signal having fixed frequency components representative of said modulated carrier, and measuring one of said fixed frequency components.

STILES C. STRIBLING, Jr.
WILLIAM T. DOUGLAS, Jr.
FRANKLIN E. TALMAGE.

REFERENCES CITED

The following references are of record in the file of this patent:

UNITED STATES PATENTS

| Number | Name | Date |
| --- | --- | --- |
| 2,269,126 | Pieracci | Jan. 6, 1942 |